United States Patent [19]
Orlicki et al.

[11] Patent Number: 5,923,825
[45] Date of Patent: Jul. 13, 1999

[54] DATA TRANSMISSION FOR A SPARSE ARRAY PRINTHEAD

[75] Inventors: David M. Orlicki, Rochester; Karen L. Herczeg, Webster, both of N.Y.

[73] Assignee: Eastman Kodak Company, Rochester, N.Y.

[21] Appl. No.: 08/759,198

[22] Filed: Dec. 4, 1996

[51] Int. Cl.[6] .............................. G06F 15/00; H04N 1/21
[52] U.S. Cl. ...................... 395/111; 395/101; 395/108; 358/296; 358/298
[58] Field of Search ................................ 395/111, 108, 395/109, 115, 112, 101; 347/118, 130, 232, 239, 241; 358/298, 296

[56] References Cited

U.S. PATENT DOCUMENTS

| | | | |
|---|---|---|---|
| 4,918,465 | 4/1990 | Morita | 347/241 |
| 5,159,357 | 10/1992 | Ng et al. | 346/147 |
| 5,294,942 | 3/1994 | Loewenthal et al. | 358/296 |
| 5,455,681 | 10/1995 | Ng | 358/298 |
| 5,546,513 | 8/1996 | Orlicki et al. | |

FOREIGN PATENT DOCUMENTS 0 645 924 A1  3/1995  Germany.

OTHER PUBLICATIONS

European Appli. 0 645 924 A1.
US Patent application No. 08/672,605.

Primary Examiner—Edward L. Coles
Assistant Examiner—Mark Wallerson
Attorney, Agent, or Firm—Norman Rushefsky

[57] ABSTRACT

A data transmission system and method is provided for furnishing data to respective drivers for a multicolor sparse array non-impact recording head that includes plural sets of recording elements for sequentially exposing a single pixel area on a recording medium. In one recording mode each recording element of a set of recording elements for recording one color is provided with the same color component exposure data to sequentially control enablement of the plural recording elements at the pixel area. In a second mode at least one of the recording elements of the set is disabled from recording at the pixel area whereas at least one other recording element of the set is enabled to record with a color component exposure at the pixel area.

20 Claims, 10 Drawing Sheets

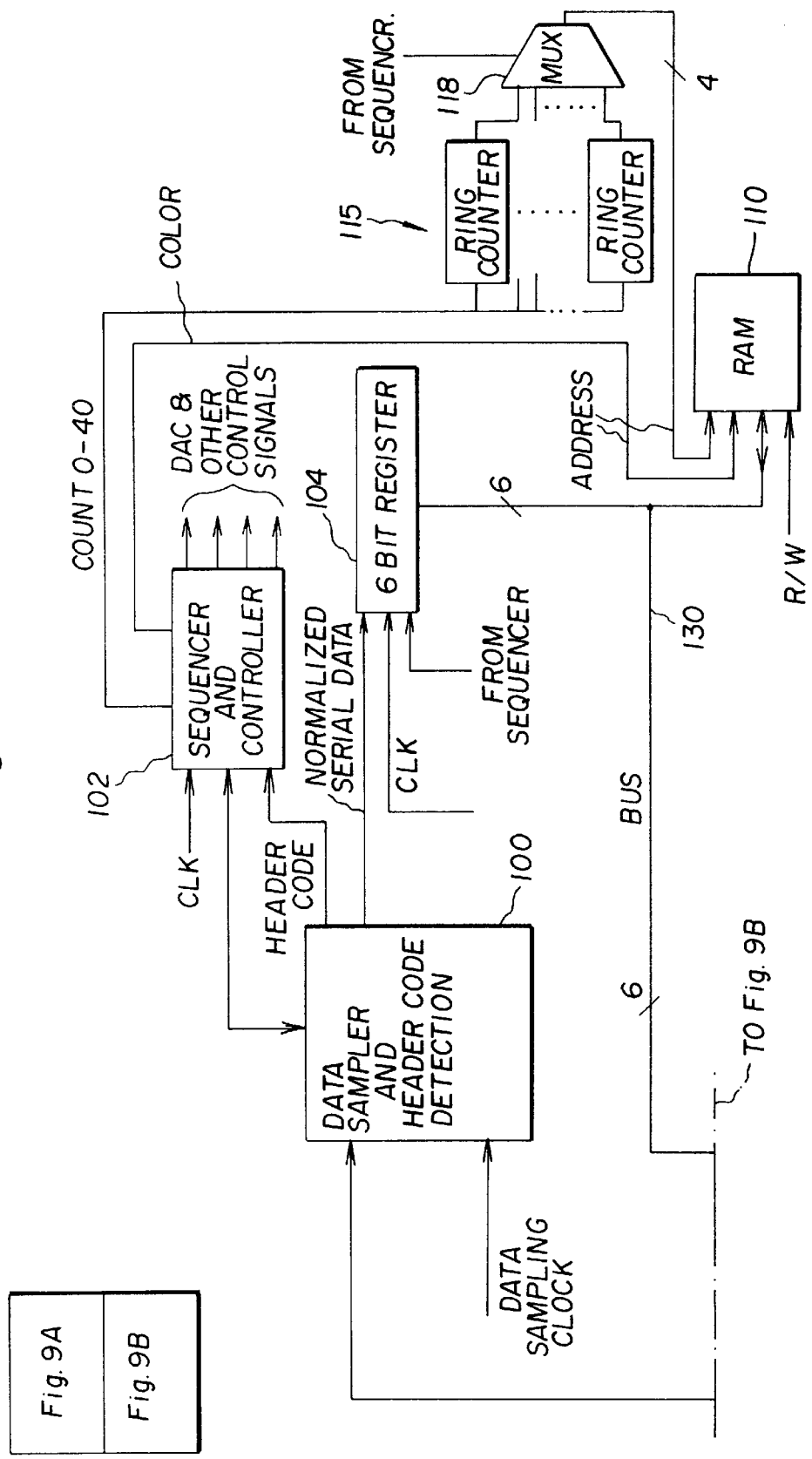

DATA TRANSMISSION FOR A SPARSE ARRAY PRINTHEAD

BACKGROUND OF THE INVENTION

1. Field of the Invention

The present invention relates in general to the field of data transmission to electronic non-impact printer arrays.

2. Brief Description of the Prior Art

In published European Application 0 645 924 A1, there is disclosed a printer that includes a sparse array LED printhead or recording head comprising an integrated array of light-emitting diodes (LEDs) supported within a rotating drum that is focused with a single optical system onto a photographic medium fixed to a concentrically mounted cylindrical shoe. The LEDs are modulated so as to raster scan image information onto the photosensitive medium as the drum rotates and is axially translated through the shoe. Data is transmitted via a rotary transformer channel from the stationary to the rotating frame of reference at a rate dictated by the measured rotational rate of the print drum. As may be seen in FIG. 1, the LEDs 39 are arranged in a 3×4 rectangular pattern or array 34.

A given physical pixel element on the medium is exposed by each of the twelve LED elements which are driven with currents corresponding to the red, green and blue (RGB) subpixel components of the data corresponding to that location. In particular, the pixel at location R(x,y), G(x,y), B(x,y) is first exposed with pixel data R(x,y) through LED R1. After n pixel intervals of fast scan direction translation, R(x,y) is again used to drive R2 and so on. After N lines of page direction translation, LED G1 is aligned with the physical location and is driven with the G (x,y) data. After n pixel intervals G(x,y) is exposed through LED G2 and so on. The process is again repeated for B(x,y) data with LEDs B1 through B4 after N more lines of page scan translation.

As may be seen in FIG. 2, data for determining enablements of the LEDs is generated by a suitable electronic data source which may be a color electronic document scanner, computer and electronic data reader (noted generally as data source 10). The data is subject to color image processing by a data image processor 12 and then subject to distribution by a data distribution device 14, an example of which is described in commonly assigned U.S. Pat. No. 5,546,513, the contents of which are incorporated herein by reference. The device 14 outputs the data to a series of taps 19 associated with the array. Control of the printer is provided by a logic and control unit 16 (LCU) that is suitably programmed and uses one or more microcomputers to provide the functions described herein in accordance with well known operation of such printers. A programmable power supply 18 is provided and controlled by the LCU to output the various control voltages, two of which $V_{REF}$ and +V will be described in greater detail below. The multibit grey level digital data defining each subpixel is converted to LED drive currents by an array of digital to analog converters (DACs) of bit width or depth M, wherein M can be say 12.

The configuration of a typical prior art DAC and current driver section is shown in FIG. 3(a). As may be seen in FIG. 4 and as more fully described in commonly assigned U.S. application Ser. No. 08/672,605, filed in the names of the inventors herein on Jun. 28, 1996, the current driver circuit 25 includes the DAC circuitry which is located on a printed circuit board 20 attached to a printer rotor and connected through a flex circuit to the LED array 34. Three LEDs are shown as representative of the twelve typically used in the array 34. LEDs may be installed or replaced en masse as part of the entire flex assembly. The current through an LED 39 is determined by the bias value +V and the output of the DAC which is input to one input of the amplifier 26. Amplifier 26 supplies a voltage potential at its output to the base of a transistor 27. A current sense resister $R_s$ is connected between ground and the output of the transistor. The potential at the front end of the resistor is fed back to the amplifier 26 to control output of the current driver 25.

The selection of the DAC reference voltage $V_{REF}$ which sets the maximum DAC output voltage, and the current sense resistor $R_s$ depends on the value of the bias voltage of each LED, +V, and the maximum LED current required. The value of $R_s$ is typically invariant over a set of LEDs of a given color, but varies from color to color ($R_{SR}$, $R_{SG}$, $R_{SB}$) depending on the radiance of the LEDs and the sensitivity of the recording medium.

It is desirable to maximize $V_{REF}$ in order to maximize the magnitude of the least significant bit (LSB) output voltage relative to the noise floor of the electronics. It is further desirable to minimize the bit width M of the DAC in order to minimize component cost and data transmission channel bandwidth. Minimum M is constrained by the requirement of the overall photographic system, including the response of the recording medium to faithfully reproduce a specified minimum image density step.

The relationship between DAC resolution and image density for a particular medium exposure characteristic is depicted in FIG. 5A. Exposure E is directly proportional to LED current and the efficiency of the LEDs in converting current to light. Printer performance specifications dictate a maximum output density $D_{max}$ and a maximum density step size, which is specified small enough so as to render the appearance of uniformly smooth density transitions in the output image. These specifications translate through the density versus exposure characteristic of the recording medium to corresponding values of $E_{max}$ and $\Delta E_{min}$; i.e., the maximum required exposure (current) and the minimum required exposure step size. DAC resolution is then bounded by equation (1).

$$M \geq \log 2 \ (E_{max} / \Delta E_{min}) \tag{1}$$

It is typical in high quality digital printers to require over 200 uniformly spaced density steps and a $D_{max}$ of over 2.0. The nonlinear density versus exposure characteristic of the recording media typically dictates $M \geq 12$ bits. $V_{REF}$ and $R_s$ are chosen such that $I_{diode}$ at the maximum code value, and for a specified exposure time, provides exposure $E_{max}$. Note that exposure for any particular color is the sum of exposures from all contributing LEDs of that color.

Consider the impact on DAC performance of increases in LED radiant efficiency as shown in FIGS. 5B and 5C. The original density versus exposure curve is illustrated in FIG. 5A along with two and four times faster versions resulting from two and four times more efficient LEDs, respectively. For fixed values of $E_{max}$ and M, the system is not capable of resolving the required minimum density step size. That is, the exposure step driven by a single LSB code value change drives a density change greater than the minimum specified magnitude.

The straightforward means to achieve the desired minimum step size with higher radiance LEDs is to simply increase M. There are, however, several drawbacks to this approach. Hardware cost increases nearly exponentially and serial transmission bandwidth increases linearly with bit depth. In addition, increasing M reduces the LSB voltage relative to the noise floor of the printer and may actually degrade perceived image quality.

From equation 1, we see that for a given M the only means for restoring dynamic range is to scale $E_{max}$ to coincide with $D_{max}$ for the media at hand. Existing printers modify either or both $V_{REF}$ and $R_s$ as depicted in FIG. 3(a) using switches 82, 83. To achieve the four to one range required to track the two-stop media variation depicted in FIG. 5A, $R_s$ is chosen according to equation (2), where $I_{max}$ is the current required to drive $E_{max}$ to achieve $D_{max}$ on the slowest media choice.

$$R_s = 2(V_{REF}/I_{max}) \qquad (2)$$

Then, with the reference side and sense side switches 82, 83 both open, $I_{max}$ is reduced by a factor of four relative to the condition in which both switches are closed for exposing the fastest media (FIG. 5C). The intermediate condition to drive $I_{max}/2$ is achieved with the reference side switch closed and the sense switch open for exposing the intermediate speed media FIG. 5B.

This technique suffers several drawbacks. In the case of high media speed, the DAC reference is reduced below the maximum set by power supply and sense resistor drop considerations, resulting in degraded signal to noise performance as the LSB output approaches the printer noise floor. In addition to noise considerations, this approach requires operator intervention on the LED rotor assembly to change switch settings of switches 82, 83, requiring breaking machine light locks and stopping and starting the printer rotor. It is also prone to operator error and mechanical switch component failure. It is preferred to eliminate the need for such switches as shown in the arrangement of FIG. 3(a) so that driver current $I_{diode}$ at the maximum code value, and for a specified exposure, provide $E_{max}$ for the sum of all contributing LEDs of that color so that the slowest recording medium can be exposed properly.

SUMMARY OF THE INVENTION

It is an object of the invention to overcome the problems identified above. In accordance with our invention, $E_{max}$ is modified by leaving the DAC reference and current source components set to their optimum values and-changing the number of LEDs used for exposure.

The above and other objects which will become apparent upon reading the description of the preferred embodiments are realized by a data transmission system for furnishing data to respective drivers for a multicolor sparse array non-impact recording head that includes plural sets of recording elements for sequentially exposing a single pixel area on a recording medium for recording with light of different color components, the system comprising first means for sequentially providing color component exposure data to sequentially control enablement of the plural recording elements at the pixel area; and second means for disabling from recording at said pixel area at least one of the recording elements of a set of recording elements associated with a color component and enabling at least one other recording element of the set to record with a color component exposure at said pixel area.

In accordance with another aspect of the invention there is provided a data transmission system for furnishing data to respective drivers for a multicolor non-impact recording head having plural sets of recording elements, the sets of recording elements each emitting light of a different respective color with each set including plural recording elements adapted to emit the same color light to sequentially expose a single pixel area on a recording medium, the system comprising first means for sequentially providing color component exposure data to sequentially control enablement of the plural recording elements of a set at the pixel area; and second means for disabling from recording at said pixel area at least one of the recording elements of a set of recording elements associated with a color component and enabling at least one other recording element of said set to record with a color component exposure at said pixel area.

In accordance with a third aspect of the invention there is provided a method for supplying data to respective drivers for a multicolor sparse array non-impact recording head that includes plural sets of recording elements for sequentially exposing a single pixel area on a recording medium for recording with light of different color components, the system comprising sequentially providing color component exposure data to sequentially control enablement of the plural recording elements at the pixel area; and disabling from recording at said pixel area at least one of the recording elements of a set of recording elements associated with a color component; and enabling at least one other recording element of the set to record with color component exposure at said pixel area.

BRIEF DESCRIPTION OF THE DRAWINGS

FIGS. 9 and 9A and 9B are a schematic illustrating a driver circuitry that is used in the preferred apparatus of the invention.

DESCRIPTION OF THE PREFERRED EMBODIMENTS OF THE INVENTION

The present invention will be described with respect to one type of printer system; however, it will be appreciated that the invention is also applicable and finds utility in other printing systems.

Figures 1, 10:
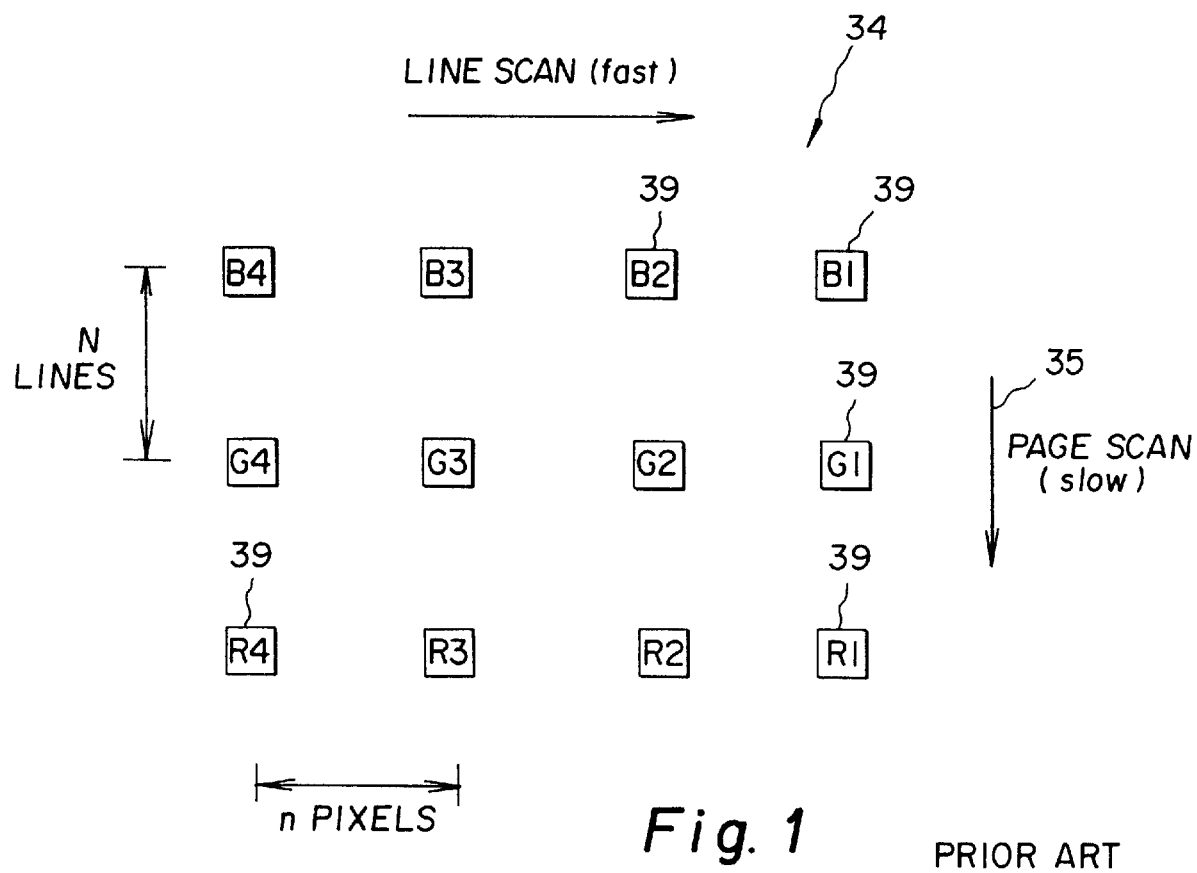
FIG. 1 is a schematic illustrating a rectangular arrangement of LEDs in a sparse array printhead in accordance with the prior art and which forms a part of the preferred apparatus of the invention.
FIG. 10 is a diagram representing pixel locations of an area of the recording medium being exposed by at least some of the LEDs in the sparse array printhead of FIG. 1.
Figure 2:
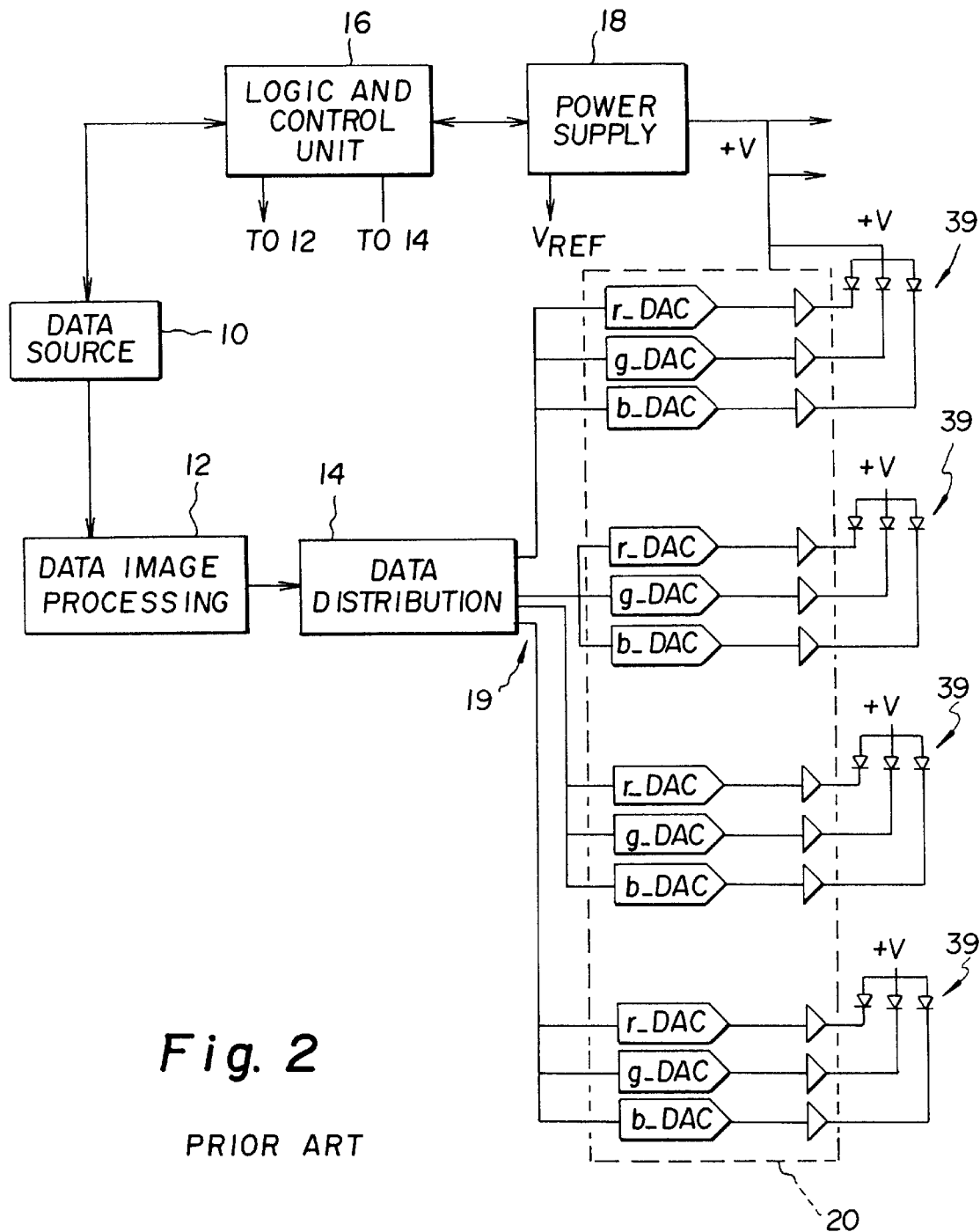
FIG. 2 is a block diagram schematic illustrating an arrangement of various components of a printer apparatus including a sparse array LED printhead in accordance with the prior art and which is also broadly illustrative of the preferred apparatus of the invention.
Figure 3A:
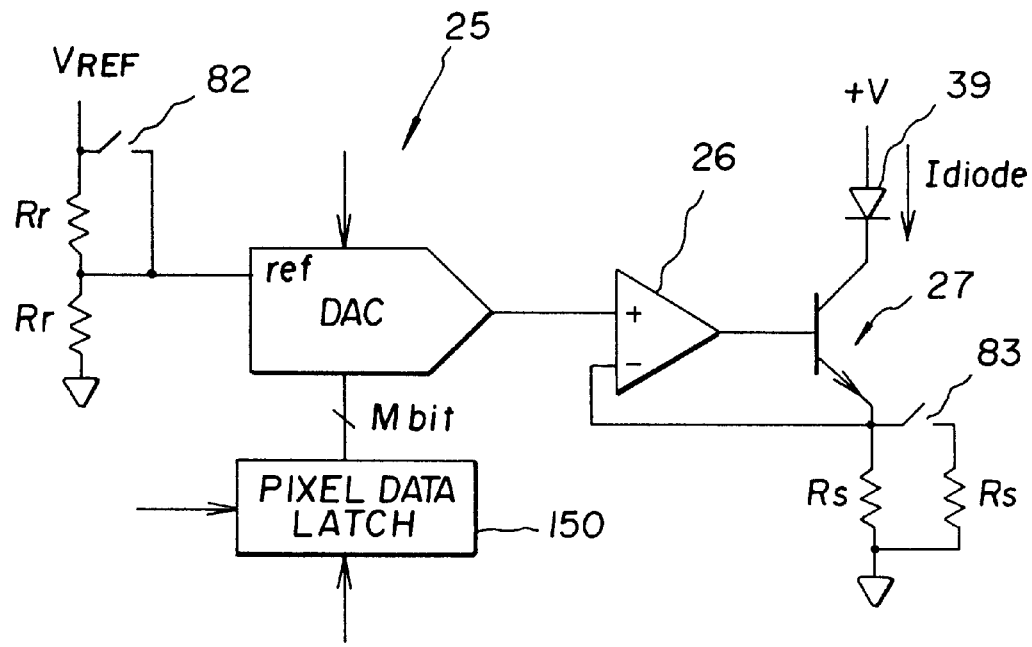
FIG. 3(a) is a block diagram schematic of a typical driver circuitry for driving the LEDs of FIG. 1 in accordance with the prior art.
Figure 3B:
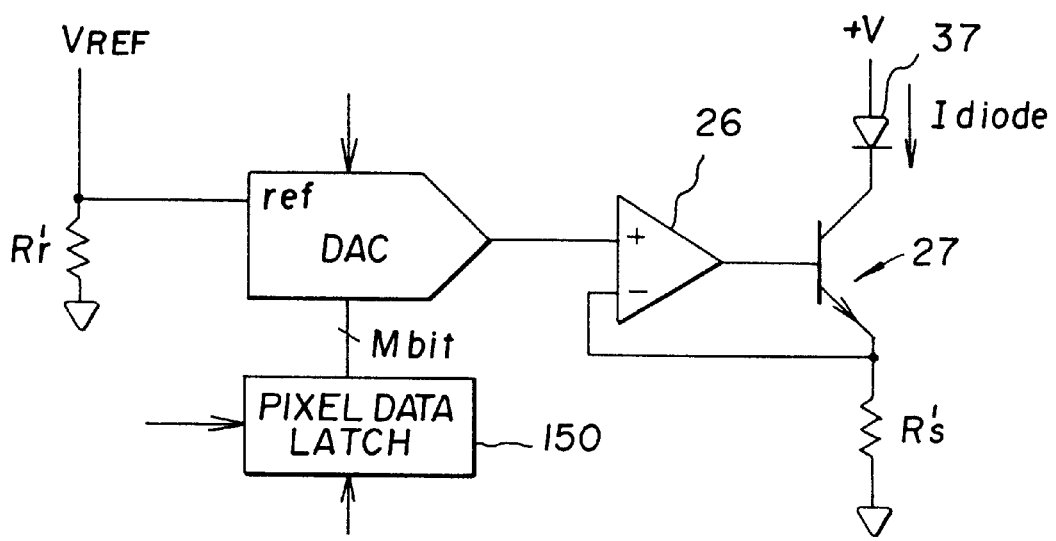
FIG. 3(b) is a similar block diagram but there is eliminated certain switches which are not required by drivers operated in accordance with the invention.
Figure 4:
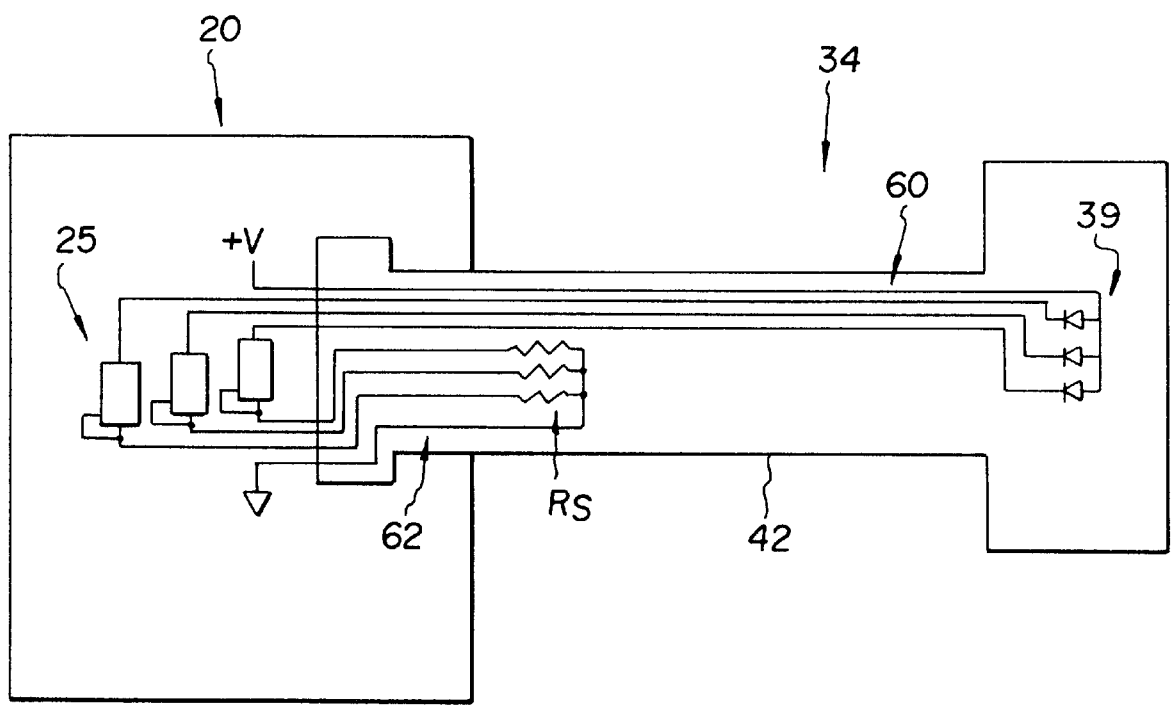
FIG. 4 is a schematic illustrating a flex circuit connection of the driver circuitry's on a circuit board with the LEDs of FIG. 1 in accordance with the invention claimed in aforementioned U.S. application Ser. No. 08/672,605 and which may be used in the preferred apparatus of the invention.
Figure 5A:
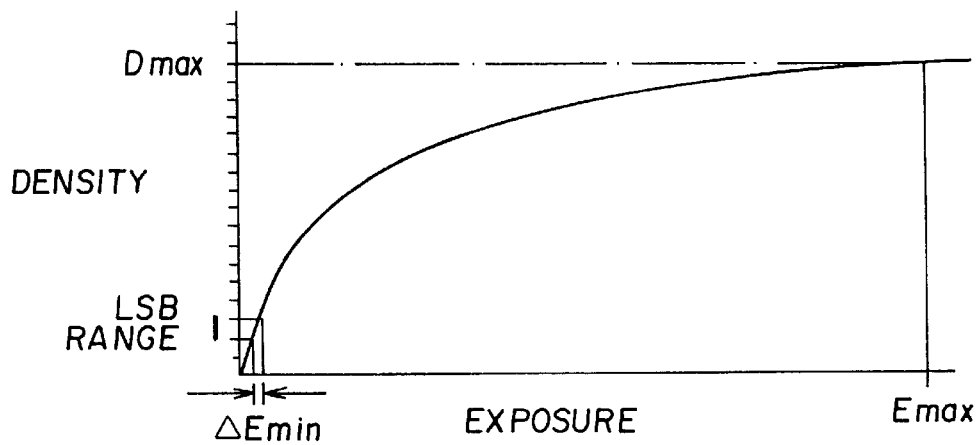
FIGS. 5A–C are a series of graphs each illustrating minimum density step size versus medium exposure speed of a light-sensitive recording medium.
Figure 5B:
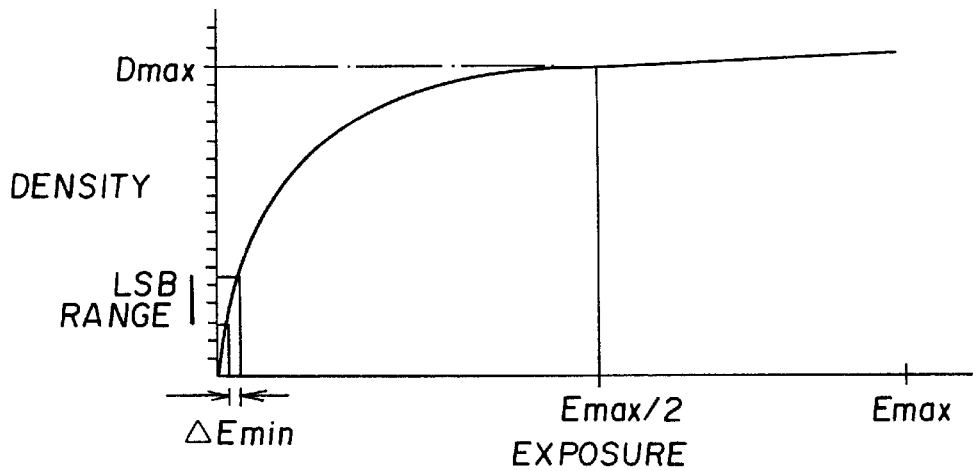
Figure 5C:
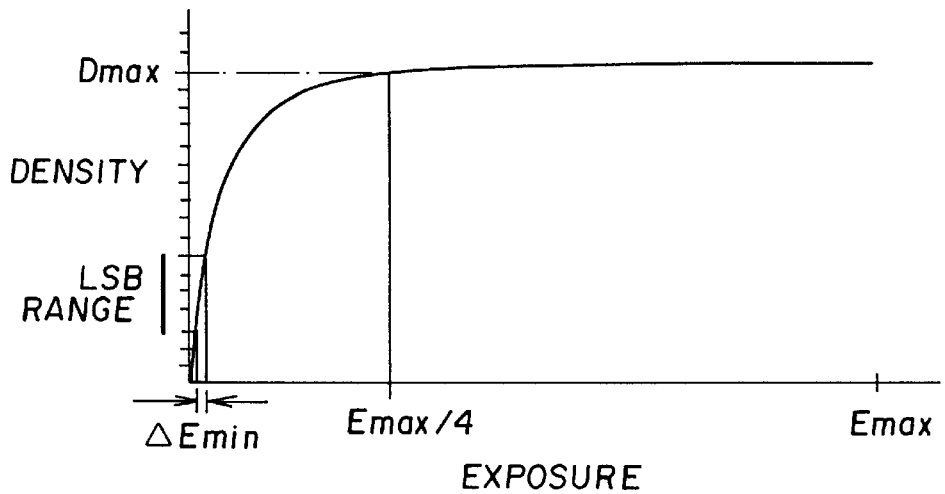
Figure 6:
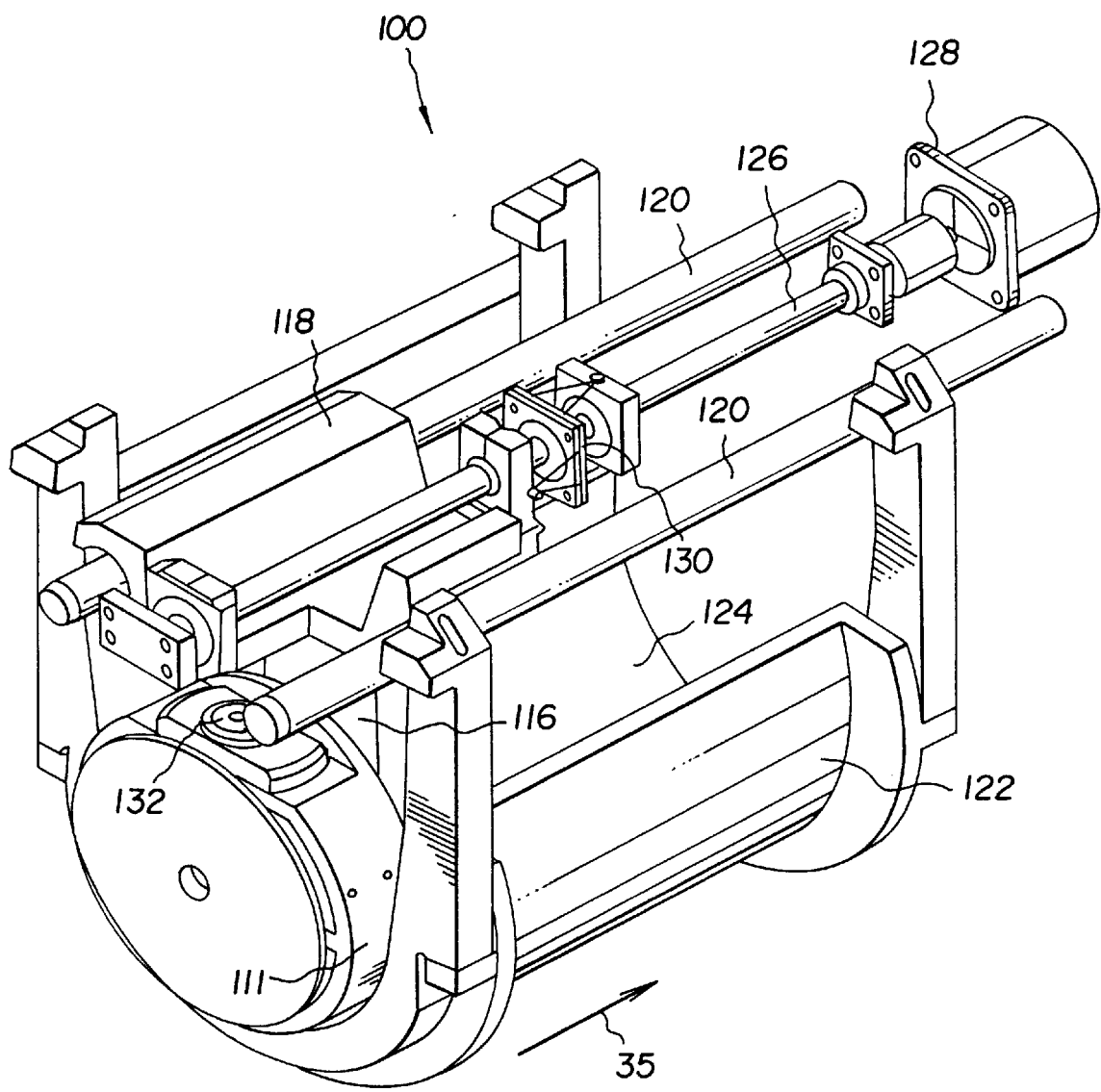
FIG. 6 is a perspective view of a rotary printing system of the prior art and in which at least portions of the apparatus of the invention is preferably incorporated.
Figure 7:
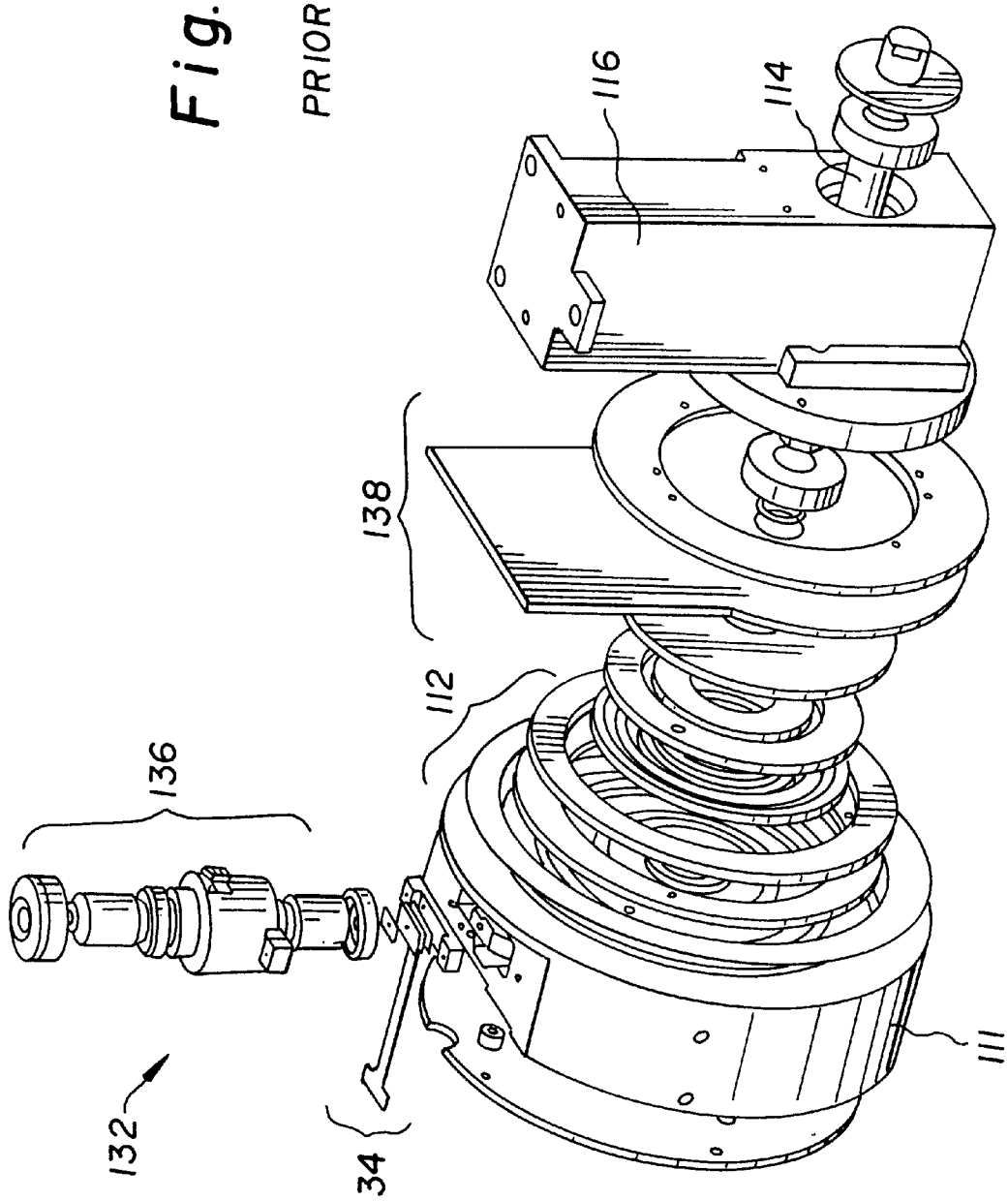
FIG. 7 is an exploded perspective view of the rotor of the system shown in FIG. 6.

With reference to EP 0 645 924 A1, there is known a rotary printer apparatus 100 employing a multi-beam color exposure assembly of type illustrated in FIGS. 1, 6 and 7. This exposure assembly includes a rotor 111 coupled to a drive motor 112 via a drive shaft 114. The drive shaft 114 is supported by a support pedestal structure 116 which hangs from a translator base 118 which is supported for movement along a pair of guide rails 120. The rotor is arranged to spin and move axially within a stationary cylindrical print shoe 122 which is provided with a sheet of a photographic recording medium 124 on the inner surface thereof. The rotor 111 is attached to a linear translation assembly comprising the pedestal structure 116 and the translator base 118, and a lead screw mechanism 126 driven by a stepper motor 128, with the lead screw being connected to the translator base 118 by a coupling 130. The rotor is simultaneously rotated by drive motor 112 in a fast scan direction and is translated past the stationary print shoe in the slow scan direction (axially) by the stepper motor 112, lead screw 126 and coupling 130, thereby achieving a raster scan pattern on the photographic recording medium held within the print shoe.

An LED printhead assembly 132 is mounted in the rotor 111 and comprises a plurality of mono-color light sources such as an array of LEDs 34 (see FIGS. 1 and 8), and a projection lens assembly 136. The printhead assembly is located within the body of the rotor, as shown in FIG. 7, with the LED array package positioned so that the LED aperture output surface is located in a plane which is perpendicular to the optical axis of the projection lens assembly. The projection lens is arranged to simultaneously image or focus all of the LEDs in the array onto a surface located in close proximity above the outer surface of the rotor, and more particularly, onto the surface of the photosensitive material held by the print shoe 122. A single lens thereby images or focuses the plurality of LEDs onto the photosensitive material as a plurality of individual images which constitute the writing beams that expose the image pixels.

Image and clock data, and power to drive the LED array, are transmitted to the rotor via a rotary transformer 138, the primary winding of which is mounted to the pedestal structure 1 16 and the secondary winding of which is mounted to the rotor 111 in accordance with the teachings of the above-identified European application. An encoder mechanism (not shown) is also provided to synchronize the activation of the LED array with the rotation of the rotor and the transfer of the digital image data and power to the LED array as the rotor rotates.

The LED array 34 described herein is arranged to generate a continuous-tone, full-color image from a digital input signal. The LED array is shown in greater detail in FIGS. 1 and 8 and comprises twelve individual LEDs 39, arranged in three columns of four LEDs each, configured such that the columns are arranged substantially parallel to the fast scan direction of movement of the rotor, i.e. the rotation of the rotor. The three columns each correspond to red, green and blue LEDs, respectively; thus, the first column contains four red LEDs, $R_1$–$R_4$, the second column contains four green LEDs, $G_1$–$G_4$, and the third column contains four blue LEDs, $B_1$–$B_4$, with the columns of light sources, and the lines of images produced thereby, being substantially parallel and spaced in the slow scan 35 direction of movement of the rotor.

Figure 8:
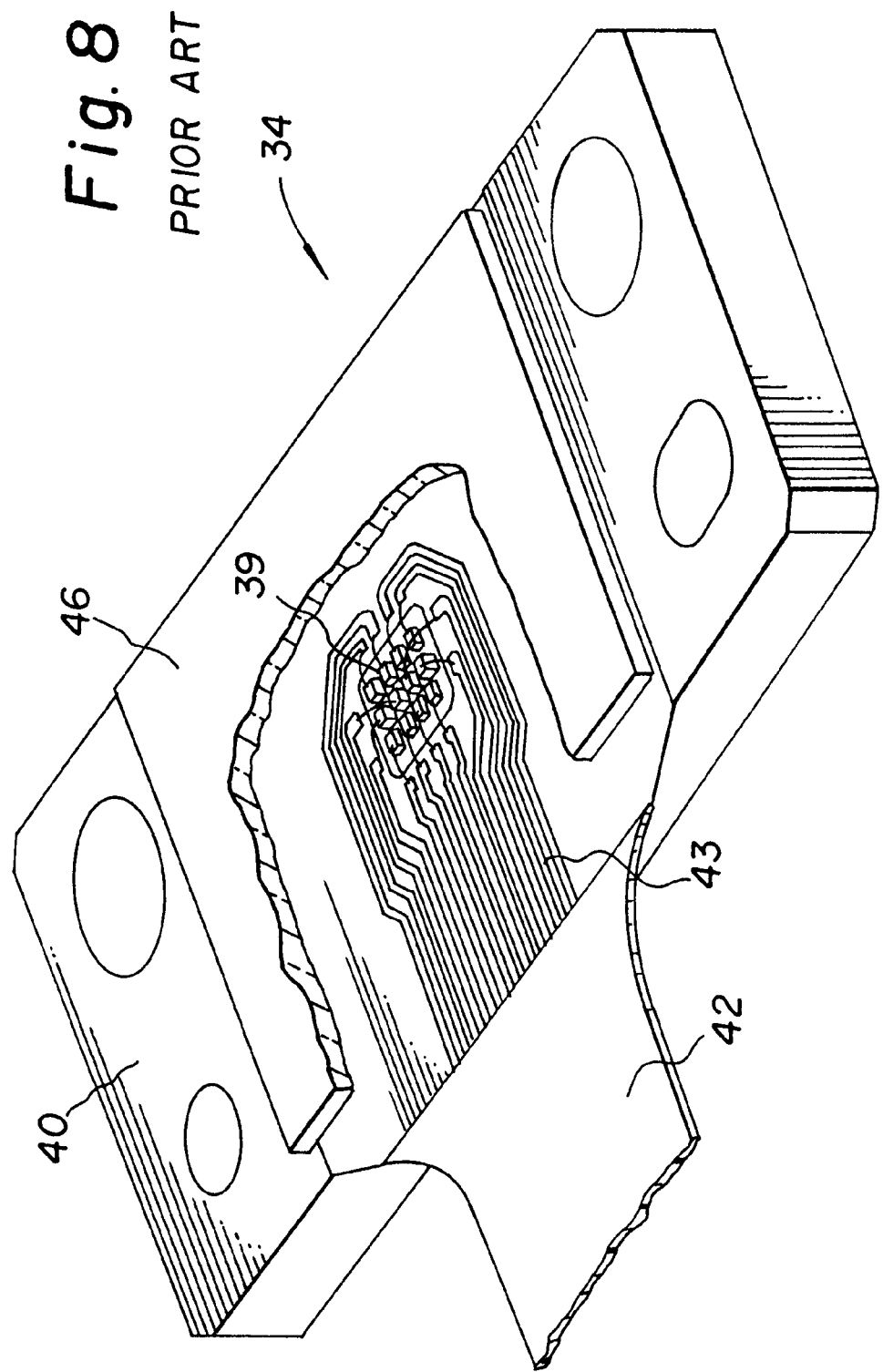
FIG. 8 is a greatly enlarged view of a flex circuit and LEDs supported on a heatsink from a part of the rotor on the prior art print system of FIG. 7.

Referring to FIG. 8, the LED array 34 is fabricated on a relatively thick block 40 of copper which acts as an efficient heat sink structure as well as a common anode electrode for all of the individual LEDs 39. Each individual LED 39 is formed with an aperture cathode electrode allowing a direct optical view of the light-emitting portion of the diode. The aperture cathode on each LED allows a direct view of the LED junction, thereby allowing a large fraction of the emitted optical radiation to be collected and conveyed by the projection lens assembly to form a writing beam or spot on the photographic recording medium. The LEDs are mounted on the heat sink 40 so that the aperture cathodes lie in a common plane. Each LED in the printhead is individually modulated with image data by applying appropriate levels of drive current to achieve any of a multiplicity of exposure levels, in the preferred embodiment 4096 different levels are available, not all of which need be used for generation of a continuous tone image. A polyimide flex circuit 42 (see FIG. 8) is provided with a rectangular aperture to provide clearance for the LED array, and with an appropriate number of gold-flashed copper signal traces 43 and bond pads, is soldered or adhesively bonded to the copper heat sink. The back surface of the flex circuit may be a solid copper ground plane which functions as the electrically common anode connector or alternatively additional traces may be integrated with the signal traces and provide a common anode connection. An individual electrical connection is made to each LED by a wire bond from the LED cathode surface to the bond pads on the flex circuit 42. The opposite end of the flex circuit is connected to the LED drive electronics on the rotor 111.

A precision aperture array mask is fabricated using a 0.010' thick glass substrate 46 coated on both surfaces with a broadband anti-reflection coating (e.g., $MgF_2$) and subsequently coated (on one surface only) with an electrically nonconductive black opaque coating such as Si or black polyimide. The array pattern of three columns of four square apertures each is etched in the opaque coating on precise centers using precision photo-lithographic methods. The array aperture mask is then aligned to the LED array 39 and is mounted to the top of the polyimide flex circuit structure 42 with a perimeter epoxy bond, thereby sealing the array to form a flex circuit and LED array assembly. The size and shape of the aperture will determine the size and shape of the writing spot on the recording medium.

The LED array is positioned within the body of the rotor 111 such that optical radiation from each individual LED is collected and conveyed to form a separate and distinct writing spot on the stationary photosensitive recording medium 124 located in close proximity to the circumferential surface of the rotor. In the preferred embodiment, this is accomplished by a known reflective optical system (see EP 644,446A), but may also be accomplished with a refractive optical system.

As disclosed above, the LED array comprises three columns of four LEDs each; with each column of LEDs comprised of a single color, and with at least one of the columns having LEDs whose light emission output is of a different color than the LEDs in another column and, preferably, with one row each having one of red, green and blue color light output. In the preferred embodiment the individual LEDs in each of the columns are spaced such that the writing spots are spaced an integral number of pixel distances apart when imaged onto the photographic recording medium, and is thus referred to as a sparse array. This facilitates simplicity in image data clock-out. In a like manner, each of the columns is located an integral number of line distances apart when imaged onto the photosensitive material. In the preferred embodiment, the writing spots produced by the four LEDs in each column are spaced a distance of four pixels apart when imaged on the photosensitive material, and the columns are spaced a distance of four lines apart.

In recording on the photosensitive material, three columns of four pixels each on the photosensitive material will receive simultaneous exposures. When the photosensitive material or recording medium is conventional photographic paper, one column of pixels will be exposed by the red LEDs, one column will be exposed by the green LEDs and one column will be exposed by the blue LEDs (assuming the respective pixels are to receive such exposures). As the rotor 111 and thus the printhead assembly 132 move along a helical path, comprising both rotational and translational components, a first column of red pixels will be exposed on the photographic recording medium by the column of four red LEDs, with each pixel being exposed to an exposure from each red LED of approximately one-quarter of the total red exposure called for by the image-bearing information signal. Four scan lines later, the first column of pixels will be exposed to the column of green LEDs and four scan lines later, to the column of blue LEDs. Thus, the LED array is configured such that in the final print image, each pixel can receive 12 successive exposures, if the information signal calls for such an exposure. As noted above, the array is mounted such that four LEDs of the same color are aligned in the direction of the fast scan (achieved by rotation of the rotor) and deliver four successive exposures of the same color in rapid succession to the same image pixel 'X'. In the preferred embodiment, the time between exposures is an integral number of pixel times for simplification of image data clock-out, and is minimized to reduce unwanted latent image decay (intermittency effect) which would be manifested as reduced exposure efficiency.

As noted in the above discussion of the prior art, a problem with the above system is that in manufacturing of such printer systems over the course of time, improvements in exposure efficiency are made in both LEDs and /or the exposure medium. That is newer LEDs may provide greater light output for the same current generated by the drivers through the LEDs. Alternatively and/or additionally, improvements in formulation of an exposure medium provide for a more light sensitive recording medium.

In general, the sparse LED array described herein partially exposes twelve separate physical image pixel locations during operation, which requires that the data from an image data file corresponding to the twelve pixels be supplied to the array. Considering the exposure of a particular pixel, the LEDs are arranged in columns by color with the motion of the print head assembly 132, such that each pixel location on the photosensitive medium is exposed D times in rapid succession by R1, R2, R3 and R4 (D=4 in FIG. 1) at intervals corresponding to the exposure time of n pixels (n=4 in FIG. 1, but may be any integral pixel pitch in general). The output of each of the LEDs provides partial exposure of a physical pixel location corresponding to a distinct data point in the image data file, with the data point preferably being represented by three bytes (R, G, B) of information. The same pixel location is exposed N line times later (in this example, N may be equal to 4) by G1, G2, G3 and G4 on n pixel intervals and again, another N line times later, by B1, B2, B3 and B4 on n pixel intervals. The pixel is thus initiated with the first exposure by R1 and terminated 2N lines and (n) (D−1) pixels later by the B4 exposure. The full color data for a given pixel is therefore used 3D (12 times in the illustrated example) during a complete exposure interval; however, the separate color components of that full color data are only used D times each (4 times in the illustrated example).

In the described printer, a first factor is that in a single pixel interval, 12 pixels are partially exposed as the printhead assembly 132 rotates, but only one is begun (with R1) and only one is completed (with B4). That is, new data is required for only one new pixel per pixel interval and one pixel's worth of data may be discarded. A second factor is that one pixel is initiated in red (R1), another pixel in green (G1) and still another pixel in blue (B1), as the printhead assembly 132 advances a single pixel interval.

Based on these factors, a strategy for minimizing data access and transmission requirements from the data source is desirable. In each pixel interval, one pixel's worth of information, i.e., one byte each of R, G and B data, corresponding to the pixels entering the field of view of the optical system of the printhead assembly 132 is supplied to the LED array. This strategy necessitates two elements of system architecture. First, since twelve distinct physical pixel locations are written to in a given pixel interval, a means for sequentially accessing subpixel level information from non-adjacent pixels is required. Second, a byte of subpixel level information (i.e., an individual pixels R, G or B color pixel component) will be transmitted only once from data image processor 12 but will be used D times, therefore a means for storing the subpixel level information is required.

Figure 9B:
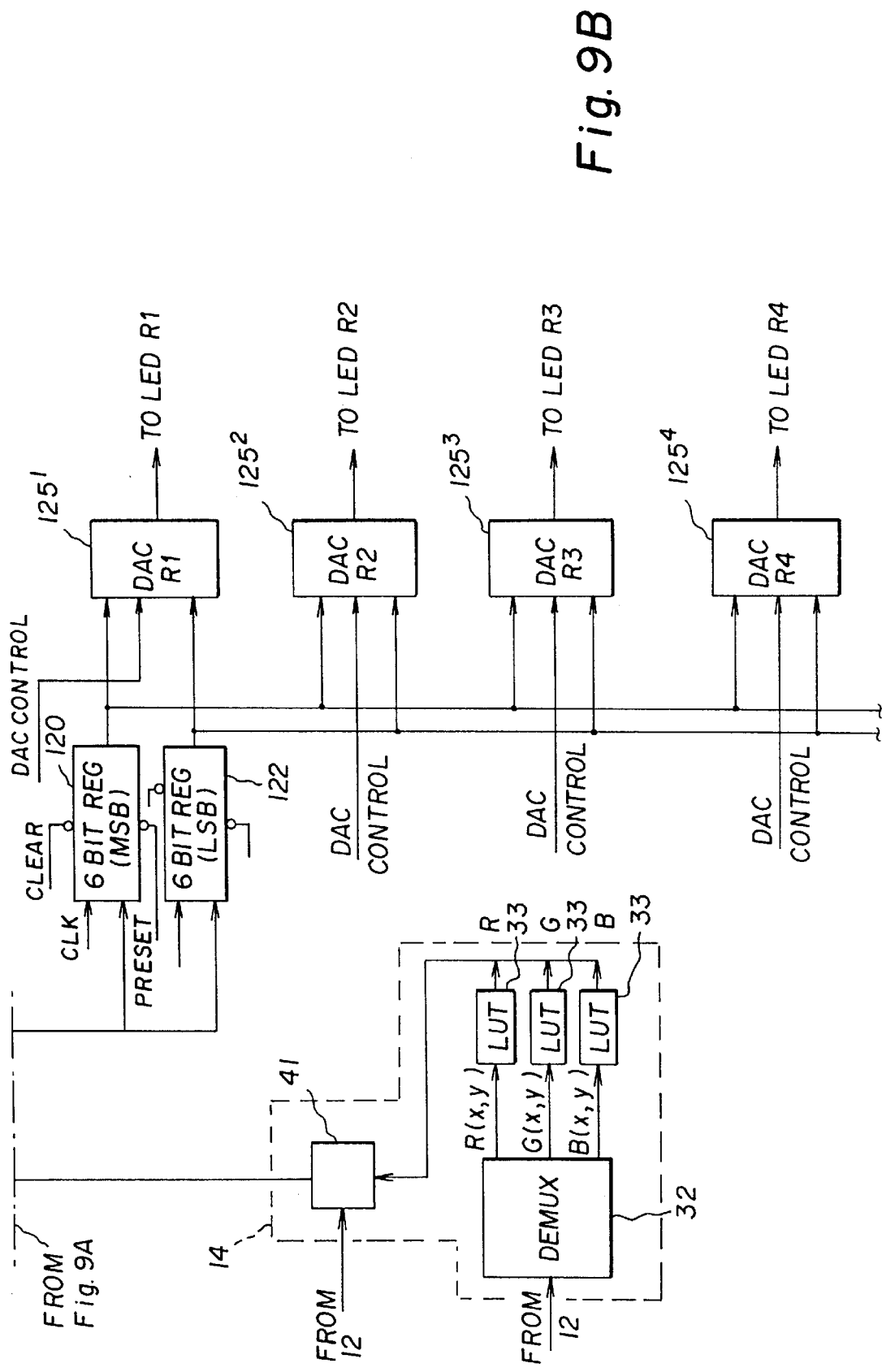

FIG. 9 illustrates the data transmission system employed for formatting data to the printhead assembly 132 in accordance with the invention. With reference to FIG. 9, the data words for individual pixels, each preferably including three eight-bit byte subpixel R, G, B color components that are transmitted line by line, from the data image processor device 12 to an input data line of a subpixel data accessing unit forming a part of a data distribution device 14. The output of the color image subpixel data from image processor 12 is such that respective color component data for pixel locations in FIG. 10 (x,y), (x,y+N) and (x,y+2N) for LEDs R1, G1, B1, respectively, are transmitted together as a 24-bit data word. The subpixel data accessing unit may include a switching or demultiplexer unit 32 that separates and supplies the subpixel components to corresponding R, G, B channels. Each of the channels may include a respective data compensation look-up-table (LUT) 33 coupled to the demultiplexer unit 32. The outputs of the LUTs 33 R, G and B are input to a serializer 41 that forms the color data signals into a serial bit stream.

The compensation LUTs 33 R, G, B are used to compensate for the highly nonlinear relationship between photographic exposure and image density, which requires that the image data stored in the image file must be appropriately filtered or "warped" before being used to drive LED currents. A data byte of 8-bits corresponding to a color component of a pixel location is supplied as the address of the LUT. Stored at the address location is a 12-bit data word corresponding to the drive current required to produce the desired exposure for that color component subject to the performance of current drivers, LEDs and the photographic media. The use of compensation LUTs is well known in the art. They are utilized in the subpixel data accessing unit to condition the image data prior to serial transmission. In addition, a 4-bits per pixel header code is added to each corrected 36-bits color data signal to generate a 40-bits signal representing the respective color component exposure data for the three pixels to be next exposed by the LEDs R1, G1 and B1. This header code marks the beginning of data for each pixel and includes information to indicate valid data and has one or two bits that are used to determine whether 2 or 4 LEDs are to be used to expose each pixel in each color component. This header code is programmed in the serializer 41 in response to a signal from the data image processor identifying the medium as one requiring only two LEDs per color for exposure rather than four. The operator may input this information to the image processor via an operator control panel on input terminal.

The respective outputs from the look-up tables 33R, G, B, are output from the serializer 41 to a data sampler and header code detection circuit 100. This circuit serially receives 12-bits per pixel per color signals and analyzes the 4-bits per pixel header code for valid data. If the data is valid, the 4-bit header code is stripped from the 40-bit signal and input to a sequencer which is a circuit that is programmed to provide various control signals as will be described. The 12-bits per pixel per color signal is then output from the detection circuit 100 serially to a 6 bit shift register 104. In this example the data is output first with the 6 most significant bits (MSBs) and then with the six least significant bits (LSBs). The data is stored in the shift register 104 until a signal from the sequencer causes the data to be parallel output to a data bus 130. The bus 130 is connected to a data input port of a RAM memory 110. Address inputs to the RAM are provided by the sequencer 102 which provides a 2-bit address signal indicative of color to which the 6-bit signal on the bus pertains. Additional signals from the sequencer are clock-type signals output at respective count intervals. The clock-type signals are counted by a series of ring counters 115. The outputs of the ring counters are multiplexed by a multiplexer 118 under a control signal from the sequencer so that a 4-bit count signal is generated and serves as a further address component to the RAM 110. The count signal represents a count of 0 to 12. Note that this count is related to the data for the number of pixels required to be stored in RAM for which data is needed for the next exposure by the 12 LEDs; i.e., for each color component 13 sets of data are required to be stored. Thus, for the red color component data, these 13 sets of data include data for the four pixel locations to be exposed next by LEDs R1–R4 and the nine pixel locations in between the 4-pixel locations. In accordance with the above-described practice of sequentially feeding data to the data distribution device 14, it is apparent that the number of color component data signals for the 3×4 sparse LED array required to be buffered in RAM 110 is 3×13=39.

When previously stored, data is required for printing, the address signals and read signal from the sequencer 102 are input to the address bus and select lines of the RAM 110 and the data for a color component of a pixel are output from the RAM 110 onto bus 130. In this phase, the data (6-bit signal) is first read into one of two registers 120 (MSB store), 122 (LSB store) and then into the other of the two registers so that the full 12-bits signal for that color component is available to a respective input of one of the digital to analog driver circuits for this color (DAC R1–R4), drivers $125^1$–$125^4$. A similar set of drivers are provided for the green and blue LEDs as are sets of registers 120, 122 that similarly receive outputs from the RAM 110. Alternatively, registers 120 and 122 may be shared sequentially by the data for the respective different color LEDs. The sequencing of data to the DACs R1–R4 is accomplished through successive reads of data from RAM 110 to the registers 120, 122. Thus, the sequencer through the count signals provides new addresses or pointers in the RAM to access data for the respective drivers. Through a DAC control signal also provided by the sequencer 102 the data in the registers 120, 122 is stored in a latch register 150 either being separate or forming a part of the respective DAC. Thus, data for the next exposure is latched into a 12-bit latch 150 forming a part of DAC $125^1$. The next read of data from RAM 110 is then shifted into registers 120, 122 and latched into DAC $125^2$. Note the data for DAC $125^2$ is different than that for DAC $125^1$ since during any exposure period they are exposing different pixel areas. However, the data used by DAC $125^1$ will later be used again by each of the DACs $125^2$–$125^4$. This is similarly true for DACs used to drive the other colored LEDs and their respective color component data. When respective color component data for all 12 LEDs is loaded in their respective DAC latches 150 a signal from the sequencer 102 causes the data to be shifted to the respective outputs of the latches 150, in addition an enable signal is also provided by the sequencer 102 to enable the drivers on the respective DAC to cause current to flow to each LED with an amplitude in accordance with the respective latched data and a common fixed duration or at least fixed for each color group.

In accordance with one aspect of the invention where the light-emitting efficiency of the LEDs (and/or speed of the photosensitive material is high so that only two LEDs of a single color component are required to expose a pixel instead of four, provision is made for blocking two of the LEDs from being operative. As noted above, the header code to each 40-bit pixel color data signal includes in the 4-bit header code a code indicating whether 2 or 4 LEDs of each color are to be used for recording the image. This header code signal is stored in the sequencer and controller 102. For each pixel of an image, data is output from RAM 110 and stored in registers 120, 122. However, upon sequential enablement of registers 120, 122 for sequential transfer of data to respective DACs R1 and R3, clear signals are provided from sequencer 102 to clear the outputs of these registers, so effectively there is latched zeros in the latches 150 of DACs $125^1$ and $125^3$. For example, after data is loaded into registers 120, 122 and is to be shifted to DAC R1 in response to an output signal from the sequencer, a clear signal is instead furnished and only zeroes are latched in DAC R1's latch register 150. Data from RAM 110 for a different pixel and thus at a different address is then loaded into registers 120, 122 and shifted into the latch register 150 of DAC $125^2$. Thereafter RAM 110 is read again at still another address and the data shifted into registers 120, 122. However, DAC R3 is to be disabled and thus a clear signal is provided to registers 120, 122 from the sequencer 102 to output zeroes data to latch 150 of DAC R3. Data for DAC R4 is then read from RAM 110 and output to registers 120, 122. The data is output to register 150 of DAC R4. Similar treatment of data is provided for each of the other colors. The enable signal is then provided to enable the DAC with a strobe type timed signal. Those DACs having non-zero data are enabled to drive their respective LEDs while those with zeroes in their respective latches are not enabled; i.e., no current is provided to drive them.

It will be appreciated that by providing the data with a header code that contains information relative to whether that data is to be used to enable two or four recording elements of that color component provides the advantages of allowing the printer assembly to be used with fast or slower media; i.e.; photosensitive materials, but with the same exposure system and provides for smaller increments of exposure (ΔE) than could be obtained where the number of recording elements used is fixed for the system.

Other modifications may includes having the sequencer read zeroes from RAM 110 into the registers 120, 122 for DACs that are to be disabled in lieu of clearing the output of the registers. In commonly assigned U.S. Pat. No. 5,546, 513, the pertinent contents of which are incorporated herein by reference, data is provided to a column correction unit that includes tapped parallel shift registers. Data for one DAC is after use shifted sequentially into essentially dummy buffers until being again shifted into a buffer associated with an LED. In such a scheme a signal may be provided for clearing the output of such buffers to a latch register associated for any DAC that is to be not enabled. Still other means may be provided that are consistent with the spirit and scope of the claimed invention.

While the invention is described with reference to LEDs, it will be appreciated that the invention finds applicability to other types of recording elements such as laser, thermal recording elements, etc.

The invention has been described in detail with particular reference to preferred embodiments thereof and illustrative examples, but it will be understood that variations and modifications can be effected within the spirit and scope of the invention.

We claim:

1. A data transmission system for furnishing data to respective drivers for a multicolor sparse array non-impact recording head that includes plural sets of recording elements, each set including plural recording elements, for sequentially exposing a single pixel area on a recording medium for recording with light of different color components, the system comprising:

first means for sequentially providing color component exposure data to sequentially control enablement of plural recording elements of the plural sets of recording elements at the pixel area; and second means for disabling from recording at said pixel area at least one of the recording elements of a set of recording elements associated with a color component and enabling at least one other recording element of the set to record with a color component exposure at said pixel area wherein said first means includes means responsive to a code associated with a sub-pixel color component data signal for determining whether one of the recording elements of the set is to be disabled in recording at the pixel area.

2. The system of claim 1 wherein said first means includes a memory and addressing means which addresses said memory to periodically repeat the output of the same data stored at the same address for use in exposing the same pixel area by plural recording element of the set.

3. The system of claim 2 in combination with a sparse array recording head.

4. The system of claim 1 in combination with a sparse array recording head.

5. A data transmission system for furnishing data to respective drivers for a multicolor non-impact recording head having plural sets of recording elements, the sets of recording elements each emitting light of a different respective color with each set including plural recording elements adapted to emit the same color light to sequentially expose a single pixel area on a recording medium, the system comprising:

first means for sequentially providing color component exposure data to sequentially control enablement of the plural recording elements of a set at the pixel area; and second means for disabling from recording at said pixel area at least one of the recording elements of a set of recording elements associated with a color component and enabling at least two other recording elements of said set to record with a color component exposure at said pixel area.

6. The system of claim 5 wherein said first means includes a memory and addressing means which addresses said memory to periodically repeat the output of the same data stored at the same address for use in exposing the same pixel area by plural recording elements of the set.

7. The system of claim 6 wherein said first means includes means responsive to a code associated with a sub-pixel color component data signal for determining whether one of the recording elements of the set is to be disabled in recording at the pixel area.

8. The system of claim 5 wherein said first means includes means responsive to a code associated with a sub-pixel color component data signal for determining whether one of the recording elements of the set is to be disabled in recording at the pixel area.

9. The system of claim 8 in combination with a sparse array recording head.

10. The system of claim 5 in combination with a sparse array recording head.

11. A method for supplying data to respective drivers for a multicolor sparse array non-impact recording head that includes plural sets of recording elements for sequentially exposing a single pixel area on a recording medium for recording with light of different color components, the system comprising:

sequentially providing color component exposure data to sequentially control enablement of the plural sets of recording elements at the pixel area; and disabling from recording at said pixel area at least one of the recording elements of a set of recording elements associated with a color component; and enabling at least two other recording elements of the set to record with the color component exposure at said pixel area.

12. The method of claim 11 and including a memory to periodically repeat the output of the same data stored at the same address in the memory for use in exposing the same pixel area by plural recording elements of the set.

13. The method of claim 12 wherein a code is associated with a sub-pixel color component data signal for determining whether one of the recording elements of the set is to be disabled in recording at the pixel area.

14. The method of claim 13 wherein a code is associated with a sub-pixel color component data signal for determining whether one of the recording elements of the set is to be disabled.

15. The method of claim 11 and including operating the recording head in a mode wherein when a pixel area is recorded with light of one color component, all recording elements of the set of recording elements associated with a color component are sequentially enabled to record at a single pixel area.

16. The method of claim 15 and including moving the recording head relative to the recording medium in a slow scan and fast scan directions to move all recording elements on the recording head into a position to record at the pixel area.

17. The system of claim 1 in combination with a rotational and translation device for moving the recording head in slow scan and fast scan directions relative to the recording medium.

18. A method of recording on a photosensitive surface using a multicolor sparse array non-impact recording head that includes plural sets of recording elements, each set being capable of recording with a different respective color exposure light and plural recording elements being associated with each set, the method comprising:

operating the recording head in a first mode wherein when any pixel area on a first photosensitive surface is exposed to light from one recording element of a set, the pixel area is subsequently and sequentially exposed to all recording elements of the set; and operating the recording head in a second mode wherein when any pixel area on a second photosensitive surface, that has a different response, characteristic to light than said first photosensitive surface, is to be recorded by exposure to light of a respective color, it is recorded using less than all of the recording elements of the set associated with the respective color.

19. The method of claim 15 and wherein each recording element that is operating in both the first and second modes is driven with a similar current level for recording a maximum exposure in the respective color.

20. The method of claim 15 wherein a code is associated with a sub-pixel color component data signal for determining whether one of the recording elements of the set is to be disabled.

* * * * *